(12) United States Patent
Morris et al.

(10) Patent No.: US 8,202,563 B2
(45) Date of Patent: Jun. 19, 2012

(54) ACIDULATE COMPOSITION AND METHODS FOR MAKING AND UTILIZING THE SAME

(75) Inventors: Gary L. Morris, Terre Haute, IN (US); Patrick A. Jobe, Becker, MN (US); Nita Livvix, Terre Haute, IN (US)

(73) Assignee: Clabber Girl Corporation, Terre Haute, IN (US)

( * ) Notice: Subject to any disclaimer, the term of this patent is extended or adjusted under 35 U.S.C. 154(b) by 694 days.

(21) Appl. No.: 12/175,371

(22) Filed: Jul. 17, 2008

(65) Prior Publication Data

US 2010/0015278 A1   Jan. 21, 2010

(51) Int. Cl.
A21D 2/08   (2006.01)

(52) U.S. Cl. ............ 426/653; 426/96; 426/99; 426/268; 426/496

(58) Field of Classification Search .................. None
See application file for complete search history.

(56) References Cited

U.S. PATENT DOCUMENTS

| | | | |
|---|---|---|---|
| 2,954,297 A | 9/1960 | Elsesser et al. | |
| 3,922,350 A | 11/1975 | Dockendorf et al. | |
| 3,959,496 A * | 5/1976 | Jackel et al. | ..................... 426/25 |
| 4,022,917 A | 5/1977 | Selenke | |
| 4,034,125 A | 7/1977 | Ziemke et al. | |
| 4,141,998 A | 2/1979 | Ziemke et al. | |
| 6,123,973 A | 9/2000 | Kuhn | |
| 6,261,613 B1 | 7/2001 | Narayanaswamy et al. | |
| 6,312,741 B1 | 11/2001 | Navarro | |
| 6,436,458 B2 | 8/2002 | Kuechle et al. | |
| 6,803,067 B2 | 10/2004 | Braginsky et al. | |
| 6,863,917 B2 | 3/2005 | Redding, Jr. et al. | |
| 2003/0031773 A1 | 2/2003 | Pacifico | |
| 2004/0096561 A1 | 5/2004 | Pacifico | |
| 2005/0202143 A1 | 9/2005 | Roy et al. | |
| 2007/0178199 A1 | 8/2007 | Minor et al. | |

FOREIGN PATENT DOCUMENTS

JP   53-159896   4/1980

OTHER PUBLICATIONS

Decker, Kimberly J., High-Profile Flatbreads, www.foodproductdesign.com, Apr. 1, 2005, Virgo Publishing, Northbrook, IL, US.

Fumaric Acid, FCC, Specification and Technical Data Sheet, Tate & Lyle, Decatur, IL, US.

* cited by examiner

*Primary Examiner* — Lien Tran
(74) *Attorney, Agent, or Firm* — Ice Miller LLP (57) ABSTRACT

A baking additive for enhancing the shelf-life and maintaining the volume of a baked product, and methods for producing and using the same. The baking additive comprises a blend of an non-encapsulated acidulate and an acidulate having a fat-based encapsulating coating that is degradable by heat. The combination of the encapsulated and non-encapsulated provides strategic release of the acidulates throughout the baking process such when the baking additive is added to a dry dough mix, the acidulates can sufficiently decrease the pH of the dry dough mix to prevent microbial contamination without interfering with glutton elasticity or the chemical leavening system.

23 Claims, 3 Drawing Sheets

ACIDULATE COMPOSITION AND METHODS FOR MAKING AND UTILIZING THE SAME

BACKGROUND

Dough-based baked food products having a high water content (e.g., tortillas, bread, bagels and other bakery goods) are particularly susceptible to food spoilage problems caused by the unwanted growth of bacteria, yeasts and molds. In order to prevent microbial spoilage, such products are often treated with preservatives to inhibit yeast, bacteria, and/or mold growth and thereby extend the shelf life of the product. Such preservatives may include calcium propionate, sorbic acid, and benzoic acid, and typically function by preventing microbes from producing the requisite energy needed to grow and reproduce.

An acidic environment in foodstuffs has been found to act synergistically with these preservatives, showing an increase in shelf-life over food products solely containing the preservatives at a neutral pH. In order to stabilize the antimicrobial preservatives that generally perform better in high acidity levels, it is known to add acidulates, such as fumaric acid, to the food product to reduce pH levels and provide an optimal acidic environment. Specifically, acidulates are added to foodstuffs to reduce the pH level of a dough to at or near the acid dissociation constant ("$pK_a$") of the particular preservative also contained therein. When the pH of the dough approaches the $pK_a$ of the added preservative, the conjugated acid form of the preservative is mostly available and therefore optimally effective at reducing microbial growth.

Adding an acidulate, such as fumaric acid, citric acid, malic acid, lactic acid, or ascorbic acid, to dry dough mixtures has proven to successfully increase the shelf life of food products in most cases. However, the addition of such acidulates to the dry mix presents problems for the resulting baked goods. For example, when such acidulates, or food acids, are added to dry bread mix, a negative effect is seen on the proteins (gluten) in the bread end product. This occurs because the elasticity of gluten is influenced by pH and a finished baked product resulting from an acidic dough tends to exhibit a denser size per mass, thereby resulting in a baked product having a decreased height and diameter.

Further, the addition of acidulates to dough can also have a negative effect on the chemical leavening system therein, resulting in low volume baked products. Typically, chemical leavening systems include a leavening acid and a leavening base (i.e. sodium bicarbonate). In most leavened products, the base is added to the dry dough mix and the acid portion is added just prior to baking. Accordingly, the leavening acid and base ideally do not react until the baking process (i.e. when the dough is heated), thereby preventing the formation of carbon dioxide until the dough cell walls are prepared to expand and trap the gas therein.

However, when an acidulate is added for preservation purposes, the acidulate dissolves at the initial stages of mixing and immediately begins to react with the dissolved leavening base. In this manner, the formation of carbon dioxide occurs prematurely and the leavening base is fully reacted prior to the baking stage. As a result, during the baking stage when the leavening gases should be produced, an insufficient amount of leavening base exists within the batter to react with the leavening acid and the rising capability of the dough is depleted. Accordingly, the addition of preservative acids to the dry dough mix can lead to many undesirable physical qualities in the finished product, some of which have been previously mentioned above.

In order to avoid some of the problems associated with prematurely acidifying dough, acidulates having low solubility have been commonly used. The advantage of using an acidulate having a low solubility is that the acidulate does not dissolve quickly into the dough mix during mixing and baking and, thus, decreases the pH of the mix more slowly than acidulates with higher solubilities. Fumaric acid is an example of such an acidulate and is commonly selected for its low solubility. If a low pH is delayed, a reduction in the deleterious effects to the gluten and the chemical leavening system will result. However, despite the low solubility of fumaric acid and other similar acidulates, even these acidulates tend to dissolve prematurely and sufficiently lower the pH of the dough mix such that some negative effects are produced in the finished product.

In an attempt to further delay the dissolution of acidulates into a dough mix, larger particle sizes of the acidulates have been employed, often ranging up to 300 microns. As is commonly known, the size of a particle is inversely proportional to the solubility of the particle (e.g., the larger the particle size, the slower the rate of dissolution). In addition, it is known to encapsulate the acidulate in a coating to further delay the dissolution of the fumaric acid into the dough mix.

Nevertheless, by increasing the resistance of the fumaric acid to dissolution through use of an increased particle size or using encapsulation techniques, the likelihood is greatly increased that the concentration of fumaric acid within the dough mix will be insufficient to adequately reduce the acidity of the dough mix to facilitate the activity of the preservative. In this manner, while the integrity of the gluten and chemical leavening system is left in tact, the product does not exhibit a satisfactory shelf-life due to its susceptibility to microbiological contamination. It has proven exceedingly difficult to achieve the desired time-dissolution profile for dough formation and baking with both of these methods. Accordingly, it is desirable to obtain a compound and/or a method that can be used to maintain or increase an extended "shelf-life" of the product in addition to increasing the volume of the end-product baked good.

SUMMARY

Compositions for enhancing the shelf-life and maintaining the volume of a baked product, as well as methods for producing and using the same. Certain compositions comprise a baking additive comprising a blend of a first quantity of acidulate comprising acidulate particles and a second quantity of acidulate, wherein each the particles of the first quantity of acidulate each comprise an edible, heat degradable encapsulating coating. The first and second quantities of acidulate may comprise citric acid, malic acid, fumaric acid, potassium citrate, sodium citrate, lactic acid and/or ascorbic acid. When the blended composition of the first and second quantities of particles are added to a dough-based product, the composition is capable of decreasing the pH of a dough-based product.

The first quantity of acidulate and the second quantity of acidulate may be combined at a ratio of about 1:1 by weight. Further, the thickness of the coating of each of the particles of the first quantity of acidulate may vary depending on the desired rate of release of the acidulate therein. For example, and without limitation, the particles of the first quantity of acidulate may each comprise a coating of between about 0.1% to about 70.0% of the total weight of the coated particle. In addition, the encapsulated coating may further comprise a fat-based coating. Further, in at least one example, the encapsulating coating of each of the particles of the first quantity of acidulate may be comprised of at feast two fats. For example, the fat-based coating may comprise a first solidified oil and a second solidified oil that may be combined at a ratio of about 1:1 by weight or any other ratio that is sufficient to form a sufficient fat-based coating to encapsulate each of the particles comprising the first acidulate. In addition, the melting point of the fat-based encapsulating coating may be between about 138 degrees Fahrenheit and about 150 degrees Fahrenheit. In another example, the melting point of the fat-based encapsulating coating may be between about 105 degrees Fahrenheit and about 122 degrees Fahrenheit.

A method for producing the above-described baking additive composition is also disclosed. One example of the method comprises the following steps: providing a first quantity of acidulate formed into a plurality of acidulate particles; providing a second quantity of acidulate; encapsulating each of the particles of the first quantity of acidulate with an encapsulating coating; and blending the first quantity of acidulate with the second quantity of acidulate not encapsulated within a coating to form a composition. Further, in at least one example, the step of encapsulating the particles of the first quantity of acidulate with an encapsulating coating further comprises the step of performing an encapsulation of each of the particles of the first quantity of acidulate particles using an encapsulating technique such as hot-melt encapsulation, spray-drying, coacervation, fluid bed coating, liposome entrapment, or any other encapsulation technique known in the art. Additionally, the method of producing the baking additive composition may comprise the steps of mixing a first fat with a second fat; melting the first fat and the second fat such that the first fat and the second fat combine in a fluid state; and coating the first quantity of acidulate particles with the fluid state.

Further, methods for producing a baked product having containing a preservative are disclosed. These methods comprise the steps of: providing the above-described baking additive; adding the baking additive to a dry dough mix for a baked product, thereby reducing the pH of the dry dough mix and activating at least one preservative contained therein; adding at least one liquid ingredient to the dry dough mix and processing the same to obtain a dough batter; an heating the dough batter to above a first temperature, thereby forming at least one pore in each of the encapsulating coatings surrounding each of the particles of the first quantity of acidulate so that at least a portion of the acidulate of the first quantity of acidulate are allowed to leach through the at least one pore in each of the encapsulating coatings. In addition, the step of processing the dry dough mix may further comprise mixing the dry dough mix. Further, in at least one example, the dough mix may further comprise a leavening system. In this at least one example, the leavening system may comprise a chemical leavening system, yeast-based leavening system, or any other leavening system used in the culinary arts. In addition, the baked product may comprise a tortilla.

DETAILED DESCRIPTION

Reference will now be made to various embodiments and specific language will be used to describe the same. It will nevertheless be understood that no limitation of scope is intended by the description of these embodiments. Throughout the specification and claims, percentages and ratios are by dry weight and temperatures are in degrees Fahrenheit, unless otherwise indicated.

Food manufacturers strive for the perfect balance of shelf-life stability and product quality. As previously noted, dough-based baked food products that are high in water content exhibit an inherent susceptibility to microbial contamination. However, particularly with respect to baked goods such as tortillas, the moisture content of the tortilla dough and, thus, the tortilla baked product, is directly correlative to producing an end product that exhibits a mouth feel, taste and pliability that is pleasing to the end consumer, as well as the ability of the end product to exhibit shelf life stability. Specifically, the total water content in the tortilla dough should be in the range of between about 30% and about 55% by weight of the dough. Further, tortillas exhibiting desirable properties typically contain from about 30% to about 40% water content with respect to the total weight of the end product.

It has been determined that the shelf-life and end volume of baked products having high residual water contents can be increased by adding an acidulate composition to the dry dough mix as described herein; The acidulate composition comprises a blend of encapsulated and non-encapsulated (or "raw") acidulate, and the addition of the composition to a dough mix has shown to increase the longevity of the end product's shelf-life beyond that which is seen with solely the addition of either encapsulated acidulate or raw acidulate. These results can be attributed, at least in part, to the combination of the encapsulated acidulate and the raw acidulate. Any acidulate known in the art may be used, including, without limitation, citric acid, malic acid, fumaric acid, potassium citrate, sodium citrate, lactic acid, and/or ascorbic acid, so long as the composition comprises a blend of raw and encapsulated acidulate. For example, in at least one embodiment, raw fumaric acid under the trade name Fumaric Acid from Tate & Lyle in London, England can be used.

Further, it is not necessary that the raw acidulate and the encapsulated acidulate comprise the same acidulate compound. In at least one example, the raw acidulate of the acidulate composition may comprise fumaric acid and the encapsulated acidulate of the acidulate composition may comprise citric acid. In an alternative example, the raw acidulate may comprise a blend of two or more acidulate compounds, such as and without limitation, a combination of citric acid and malic acid, and the encapsulated acidulate of the acidulate composition may comprise citric acid, fumaric acid and potassium citrate. It will be understood that any combination of acidulates may be used in conjunction with the acidulate composition so long as a portion of the acidulate comprises raw acidulate and a portion comprises encapsulated acidulate.

When the acidulate composition is added to a dry dough mix, a defined amount of raw acidulate is allowed to react at an early stage with the dry dough mix in a controlled manner. Further, the encapsulated acidulate is prevented from early reaction with available basic compounds (i.e. the leavening base). By way of a non-limiting example, the acidulate composition may comprise about 50% of encapsulated fumaric acid (by dry weight) and about 50% of raw fumaric acid (by dry weight); however, it will be appreciated that any ratio of encapsulated acidulate and raw acidulate may be added so long as both components are present in sufficient amounts to support the antimicrobial effects of the preservative.

The particles (both raw and encapsulated) comprising the acidulate composition may comprise a mean particle size of less than about 1,000 microns (pre-coating with respect to the encapsulated portion). In at least one embodiment, about 10% of the total composition comprises a particle size of less than about 150 microns (pre-coating) and about 90% of the total acidulate blend comprises a particle size of less than 600 microns (pre-coating).

As previously described, in addition to the raw acidulate, the composition further comprises encapsulated acidulate. The encapsulated acidulate particles may comprise any mean particle size between about 5 microns and about 1,000 microns and, in at least one embodiment, the encapsulated acidulate comprises a mean particle size between about 200 microns and about 300 microns. The encapsulated acidulate comprises acidulate coated in a heat-degradable coating. In at least one embodiment, the coating comprises a fat-based coating. Alternatively, the coating may comprise a fat-based coating having a plurality of crystals disposed in a mesh-like configuration. The encapsulated acidulate may be encapsulated using methods commonly known in the art, such as hot-melt encapsulation, spray drying, extrusion, coacervation, fluid bed coating, or liposome entrapment.

It will be appreciated that any type of edible, heat-degradable coating may be used, so long as the coating is capable of maintaining an amount of the acidulate within the capsule prior to being subjected to heat. For example, the coating may be selected from the group consisting of lipid materials such as, but not limited to, mono-, di- and triglycerides, waxes, and organic esters derived from animals, vegetables, minerals and modifications. Some examples include soybean oil, cottonseed oil, canola oil, camuba wax, beeswax, tallow, palm kernel oil and mixtures thereof.

The encapsulated acidulate may comprise any thickness of coating. In reference by total weight of the encapsulated acidulate, the acidulate may be present in the amount of greater than about 0.001% by weight and the coating may be present in the amount of less than about 99.999% by weight. However, it will be understood that when the coating used to encapsulate the acidulate comprises more than about 1.0% of the overall baking mix to which the acidulate composition is added, the underlying formula of the baking mix may be negatively affected and the end baked product may not produce optimal characteristics. When the encapsulated acidulate comprises between about 0.1% to about 70.0% coating, by weight and, accordingly, from about 99.9% to about 30.0% acidulate, by weight, such negative affects are typically avoided.

The thickness of the coating on each of the encapsulated acidulate particles may vary from particle to particle, or be consistent throughout all of the encapsulated acidulate particles included in the acidulate composition. For example, the thickness of the coating on each of the encapsulated acidulate particles may be designed to enable a steady release of acidulate into the baking mix when heat is applied over time during the baking process.

The melting point of each capsule is dependent upon the specific types of fat(s) used therein as well as the thickness of the coating. In one embodiment, the capsule is comprised of at least two different fat products and exhibits a melting point of between about 138 degrees Fahrenheit and about 150 degrees Fahrenheit. In an additional embodiment, a mixture of about 50% Stable Flake-S solidified oil and about 50% Trans Advantage solidified oil is used to form the coating. In this embodiment, the coating may exhibit a melting point between about 105 degrees Fahrenheit and about 122 degrees Fahrenheit.

Now referring to the preparation of the acidulate composition as a whole, the fat-based coating for the encapsulated acidulate component is prepared by mixing the selected fat(s) with any desired additives and thereafter melting the fat to a fluid state. In the embodiment where more than one fat is used to form the capsule, the different fats are mixed together in the desired ratio and thereafter melted such that the fats combine in a fluid state. For example, and without limitation, Stable Flake-S solidified oil and Trans Advantage solidified oil may be mixed together at a ratio of about 1:1 by weight, and thereafter melted such that the two types of fat combine in a liquid state.

After the fat is in a liquid form, the liquid is used to prepare the encapsulated acidulate. Specifically, the desired amount of acidulate is encapsulated with the fat mixture by any encapsulation technique known in the art. The amount of acidulate to be encapsulated is dependent upon the desired ratio of encapsulated acidulate to raw acidulate contained within the acidulate composition, as well as the desired thickness of the coating. After the encapsulated acidulate has been prepared, raw acidulate is added to the encapsulated acidulate at the desired ratio and combined therewith such that the raw acidulate and the encapsulated acidulate are evenly dispersed with one another. As previously described, the ratio of raw acidulate to encapsulated acidulate may comprise any proportion that produces beneficial results, and in at least one embodiment, the raw acidulate and the encapsulated acidulate are combined at a ratio of 1:1 (by weight, pre-coating).

The acidulate composition can be added directly to the raw ingredients for preparing baked goods. For example, the acidulate composition can be added to a dry dough mix at about 0.1% to about 1.0% of the total weight of the raw ingredients on a dry weight basis. In at least one embodiment, the acidulate composition is present in the dry dough mix in an amount of about 0.25% to about 5.0% on a dry weight basis. For example, the acidulate composition can be incorporated into a flour dough by adding it to the flour or to the moist dough.

The blend of the acidulate composition enables the acidulate to be available to react with a dough mixture containing a preservative in two distinct phases. Specifically, in the first phase the raw acidulate portion of the composition is immediately available to reduce the pH of the dough mix to near or at the $pK_a$ value of the preservative contained within the dough mix. Accordingly, when the acidulate composition is added to a dough mixture, the raw acidulate is immediately available to decrease the pH of the dough mix and thereby optimize the antimicrobial effects of the preservative contained therein during the mixing and proofing stages. It will be recognized that the acidity resulting from the addition of the raw acidulate component of the acidulate composition may cause a reaction with some of the leavening base contained within the mix. However, this reaction can be minimized by controlling the amount of raw acidulate added to the dough mix. Accordingly, due to the decreased pH of the dough, the dough can be adequately processed through mixing, kneading or and/or machining prior to baking with decreased risk with respect to microbial contamination.

The second phase of acidulate availability is initiated by the heat from the baking process. After the dough has been adequately processed, the dough batter is subjected to heat and the capsules containing the encapsulated acidulate undergo gradual degradation. In one embodiment, the degradation of the capsule weakens the capsule structure and forms at least one pore therein. The pore allows the acidulate contained within the capsule to be released from the capsule and into the baking product at a controlled rate. Alternatively, depending on the thickness and/or composition of the coating, the heat degradation may result in a plurality of pores in the coating such that the acidulate can leach from within the capsule at an increased rate.

Because the second phase of acidulate is released into the dough only after the dough is heated, the second phase of acidulate has little, if any, affect on glutton extensibility or the leavening reaction. By way of example and without limitation, where the dough mixture comprises a yeast-based leavening system, the addition of a large amount of raw acidulate to the dough mixture will detrimentally decrease the pH of the dough mixture, thereby killing the yeast and preventing the production of carbon dioxide that is necessary for leavening the dough. However, when the acidulate composition described herein is employed, the yeast is capable of leavening the dough throughout the proofing stage (until the dough is heated to about 120° F. and the yeast is killed), as the pH of the dough mixture is not substantially decreased. Accordingly, the acidulate composition described herein has a minimal effect (if any) on the production of carbon dioxide of the yeast.

In another example, the dough mixture may comprise a chemical leavening system comprised of sodium bicarbonate and a leavening acid. In conventional systems where raw acidulates are employed to work in concert with a preservative, because of the competition between the acidulate and the leavening acid to react with the sodium bicarbonate, it is not uncommon for formulas to call for an increased amount of sodium bicarbonate to ensure that a sufficient amount of sodium bicarbonate is present to react with both the acidulate and the leavening acid such that adequate leavening is achieved. In this manner, the sodium bicarbonate functions as a buffer to compensate for the decreased pH resulting from the addition of the raw acidulate to the dough mixture.

The addition of the acidulate composition described herein allows for the reduction in the amount of sodium bicarbonate added to the dough mixture as only a limited amount of raw acidulate is available to react with the sodium bicarbonate prior to completion of the leavening process. As a result, the acidulate composition has a minimal effect (if any) on the rate of reaction between the sodium bicarbonate and the leavening acid, as the encapsulated acidulate is not available to react until after the leavening process is substantially complete. Thereafter, when the dough mixture is heated to the desired temperature, the capsules of the encapsulated acidulate degrade and the acidulate contained within the capsules is allowed to leach into the dough. As the encapsulated acidulate is not released into the dough until after the leavening system has reacted, the finished baked product exhibits desirable volume, taste, and microbial-resistant characteristics.

Further, unlike the first phase, the release of acidulate in the second phase may occur over a period of time. The release rate of the acidulate from the capsules is dependent upon several factors. Primarily, and as previously noted, it will be appreciated that the rate and manner in which the coating degrades is dependent on the composition and thickness of the encapsulating coatings. Accordingly, the composition and/or dimensions of the capsule may be manipulated to achieve the desired release rate. For example, fats comprising a higher melting point degrade slower when subjected to lower temperatures and thereby release the acidulate contained therein at a slower rate. Similarly, fats comprising a lower melting point typically degrade faster.

The thickness of the coating can affect the rate of acidulate release from within a capsule (e.g., the thicker the coating, the longer the coating may take to degrade or the higher the temperature may be required). Accordingly, coating thickness may be manipulated depending on the temperatures required to bake a specific baked goods. For example, the coating thickness of the encapsulated particles may be increased when the acidulate composition is used in conjunction with baked goods that require baking at higher temperatures. In this manner, the coating thickness can better withstand the higher baking temperatures and maintain a controlled release of acidulate.

Furthermore, the manner in which the capsule degrades is another factor that can affect release rate of acidulate from within the capsule. Depending on what compounds the capsule comprises, the capsule may degrade to form one pore or a plurality of pores. As previously noted, the number and size of pore formation affects the release rate of the acidulate from the capsule. Accordingly, it will be appreciated that these factors may be controlled to produce the desired rate of release of the acidulate into the baked good.

It will be appreciated that the degradation of the capsules is not reversible. Accordingly, after the baking process, each capsule comprises at least one pore through which the encapsulated acidulate is capable of traversing. As previously mentioned, most dough-based food products comprise a relatively high water content. Accordingly, the acidulate contained within each of the partially degraded capsules is subjected to an osmotic pressure exerted by the water content of the dough-based food product. Over time, this osmotic pressure facilitates the leaching of the acidulate from within the partially degraded capsules into the food product. As the acidulate slowly leaches into the baked food product, the acidulate decreases (or maintains, depending on the rate the acidulate is released from the capsule) the pH of the baked good, thus promoting the efficiency of the preservative.

Due to the distinct phases in which the acidulate is available to decrease the pH of the dough mix, the leavening system is not inhibited and full leavening dough may be achieved. Consequently, the addition of the acidulate composition to a dough mixture produces a baked product exhibiting a superior volume and having a longer shelf life than the dough products of the prior art. Further, use of the acidulate composition enables for the baked product to contain a reduced amount of sodium bicarbonate. Because the sodium bicarbonate is not significantly depleted by the presence of a large amount of acidulate in the dry mix, extra amounts of sodium bicarbonate need not be added to the dough mix, thereby decreasing the salt content and ingredient overhead of the end product. This is primarily because the first phase of fumaric acid is regulated and the second phase of acidulate is not released until after the leavening process has occurred.

The following are examples of compositions prepared using the fumaric acid composition in tortilla doughs. The examples are also compared to tortilla doughs prepared using other food acidulates, and the Figures described below serve to demonstrate the improved results described herein. The examples are not meant to limit the scope hereof, as is solely defined by the claims.

EXAMPLE 1

Tests were run using the below-described method of preparation and ingredients to illustrate the effects of including the acidulate composition in a flour tortilla formulation. A control flour tortilla batch was prepared from the following ingredients:

TABLE 1

| Ingredients | Grams | Weight % |
|---|---|---|
| Flour | 1004.6 | 61.84 |
| Salt | 15 | 0.9234 |
| Shortening | 60 | 3.6936 |
| Leavening | 11.8 | 0.7264 |
| Sodium Propionate | 4 | 0.2462 |
| Potassium Sorbate | 4 | 0.2462 |
| SSL | 5 | 0.3078 |
| Cysteine (reducing agent) | 0.03 | 0.0018 |
| Water | 520 | 32.01 |

The ingredients listed in Table 1 were combined at 100° F. The water and flour mixture was mixed for 2 minutes at a low speed with a dough hook. The dough was allowed to stand for 5 minutes and then divided into 50-gram balls that were heat pressed at 175° F. for 10 seconds. The raw tortillas were then baked on a griddle at 400° F. for 30 seconds on each side, and subsequently cooled.

Further, a second batch of tortilla specimens were prepared containing raw fumaric acid as the acidulate. The procedure used to prepare the second batch of specimens was the same as the control batch, except that the following ingredients were used:

TABLE 2

| Ingredients | Grams | Weight % |
|---|---|---|
| Flour | 1000 | 61.56 |
| Salt | 15 | 0.9234 |
| Shortening | 60 | 3.6936 |
| Leavening | 11.8 | 0.7264 |
| Raw Fumaric Acid | 4.6 | 0.2832 |
| Sodium Propionate | 4 | 0.2462 |
| Potassium Sorbate | 4 | 0.2462 |
| SSL | 5 | 0.3078 |
| Cysteine (reducing agent) | 0.03 | 0.0018 |
| Water | 520 | 32.011 |

A third batch of tortilla specimens were prepared containing the acidulate blend described herein. Specifically, the acidulate of the third batch of tortillas comprised a fumaric acid blend comprising about 50% by weight raw fumaric acid and about 50% by weight encapsulated fumaric acid. In addition, the capsule of the encapsulated fumaric acid exhibited a coating thickness of about 50% by weight (as compared to the encapsulated fumaric acid contained therein) and comprised Stable Flake-S oil and Trans Advantage oil combined at a ratio of about 1:1.

The procedure used to prepare the third batch of specimens is the same as in Table 1, except that the following ingredients were used:

TABLE 3

| Ingredients | Grams | Weight % |
|---|---|---|
| Flour | 1000 | 61.56 |
| Salt | 15 | 0.9234 |
| Shortening | 60 | 3.6936 |
| Leavening | 11.8 | 0.7264 |
| Fumaric Acid Composition | 4.6 | 0.2832 |
| Sodium Propionate | 4 | 0.2462 |
| Potassium Sorbate | 4 | 0.2462 |
| SSL | 5 | 0.3078 |
| Cysteine (reducing agent) | 0.03 | 0.0018 |
| Water | 520 | 32.011 |

Tortillas from each test batch were evaluated after baking for volume, eating quality, and microbial growth. Thereafter, tortilla specimens from of each batch were heat sealed in cellophane bags, bagged in ZIPLOCK® freezer pouches and stored at about 77° F. All test batches of tortilla samples were checked periodically for visual signs of microbial growth, volume reduction, and overall appearance over a 6-month period.

Figure 1A:
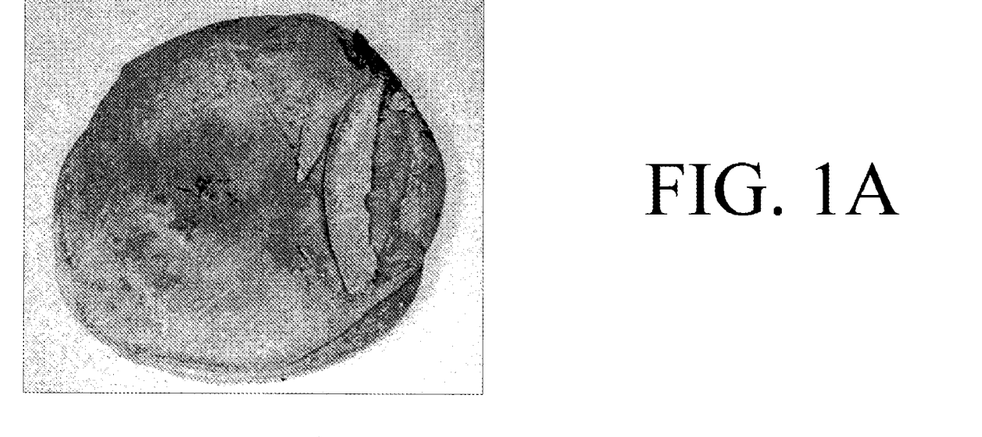
FIG. 1A shows a photograph illustrating a tortilla from the control batch of specimens not containing an acidulate at the end of a 6-month period.
Figure 1B:
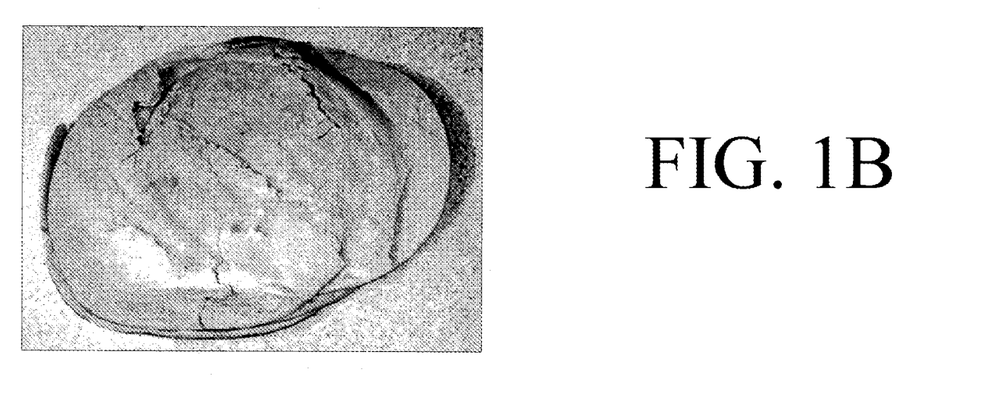
FIG. 1B shows a photograph of a tortilla from a second batch of specimens containing raw acidulate at the end of a 6-month period.
Figure 1C:
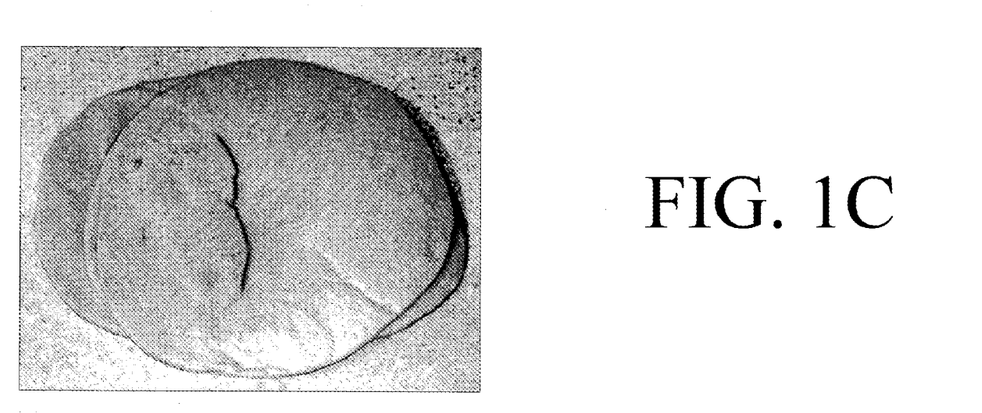
FIG. 1C shows a photograph of a tortilla from a third batch of specimens containing an embodiment of the acidulate composition disclosed herein at the end of a 6-month period.

As illustrated by FIG. 1A, by the end of the 6th month, visible signs of mold were present on the control flour tortillas of the first batch. Further, as shown in FIG. 1B, the second batch containing solely raw fumaric acid produced tortillas having low volumes due to the raw fumaric acid competing with the leavening system. In addition, the tortillas of the second batch also displayed visual signs of microbial growth, albeit to a lesser extent than the control tortillas of the first batch, as well as undesirable texture and off-flavor at the end of the 6-month period. However, as illustrated in FIG. 1C, the tortilla specimens of the third batch containing the acidulate composition described herein had not molded by the end of the 6-month test. Additionally, the tortillas containing the disclosed acidulate composition exhibited sufficient volume and had no off-flavor or undesirable texture at the end of the 6-month period or anytime after baking.

EXAMPLE 2

Figure 2:
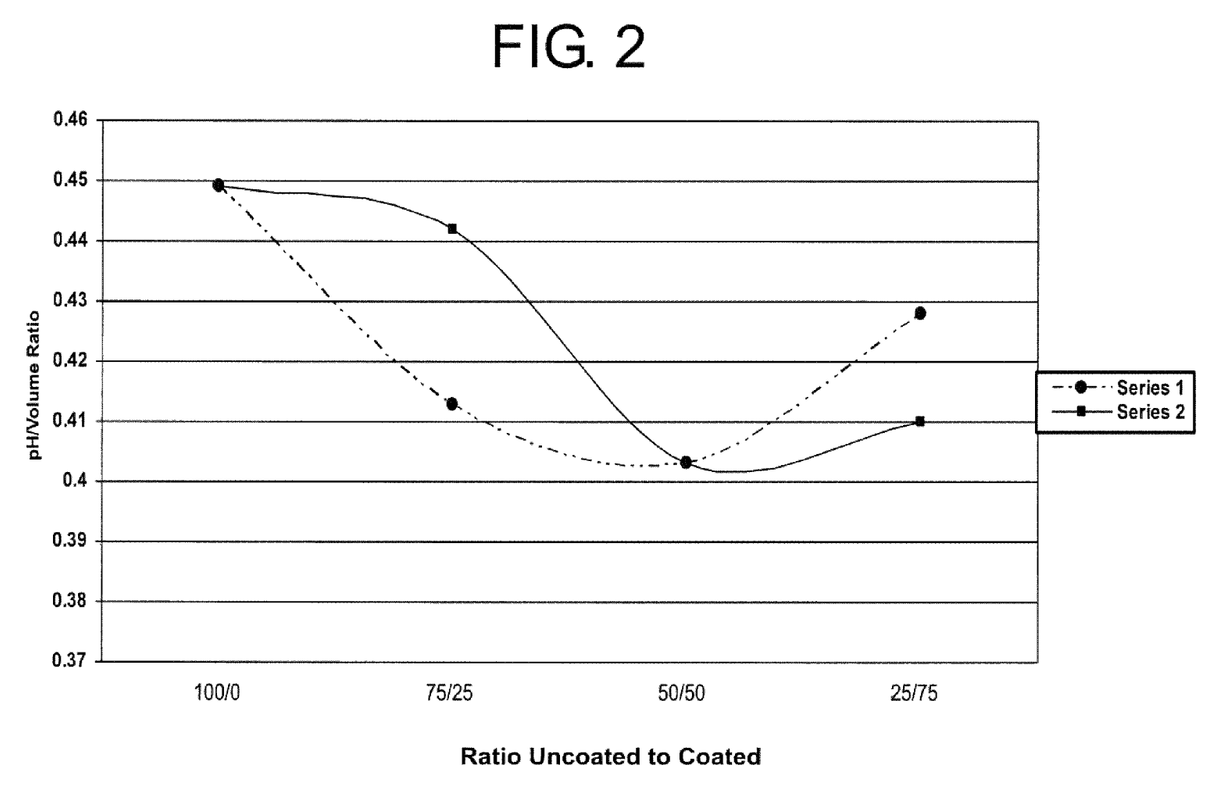
FIG. 2 shows a line graph illustrating the pH to volume ratio of several tortilla doughs each made comprising different embodiments of the fumaric acid composition.

Now referring to FIG. 2, several different ratios of raw fumaric acid versus encapsulated fumaric acid were added to the tortilla doughs prepared according to the procedure and ingredients described in conjunction with Table 3. The pH to volume ratio of the resulting tortillas were graphed as a function of these ratios. Specifically, the data set comprising Series 1 was based on a first set of tortilla doughs prepared according to the procedure and ingredients described in conjunction with Table 3 and the data set comprising Series 2 was based on a second set of tortilla doughs prepared according to the procedure and ingredients described in conjunction with Table 3. The pH of the doughs is indicative of the dissolution of the acid; the lower the pH, the more acid has been dissolved into the dough. The two lines shown represent two series of doughs prepared as indicated above, with the exception that each plot point comprises a different ratio of raw fumaric acid to encapsulated fumaric acid.

The ratios shown on the X-axis correspond to the different ratios of fumaric acid compositions used to prepare the tortilla doughs. As seen in FIG. 2, the optimum pH and volume for both series of formulations were the tortilla doughs comprising about a 1:1 ratio of encapsulated fumaric acid to raw fumaric acid.

Figure 3:
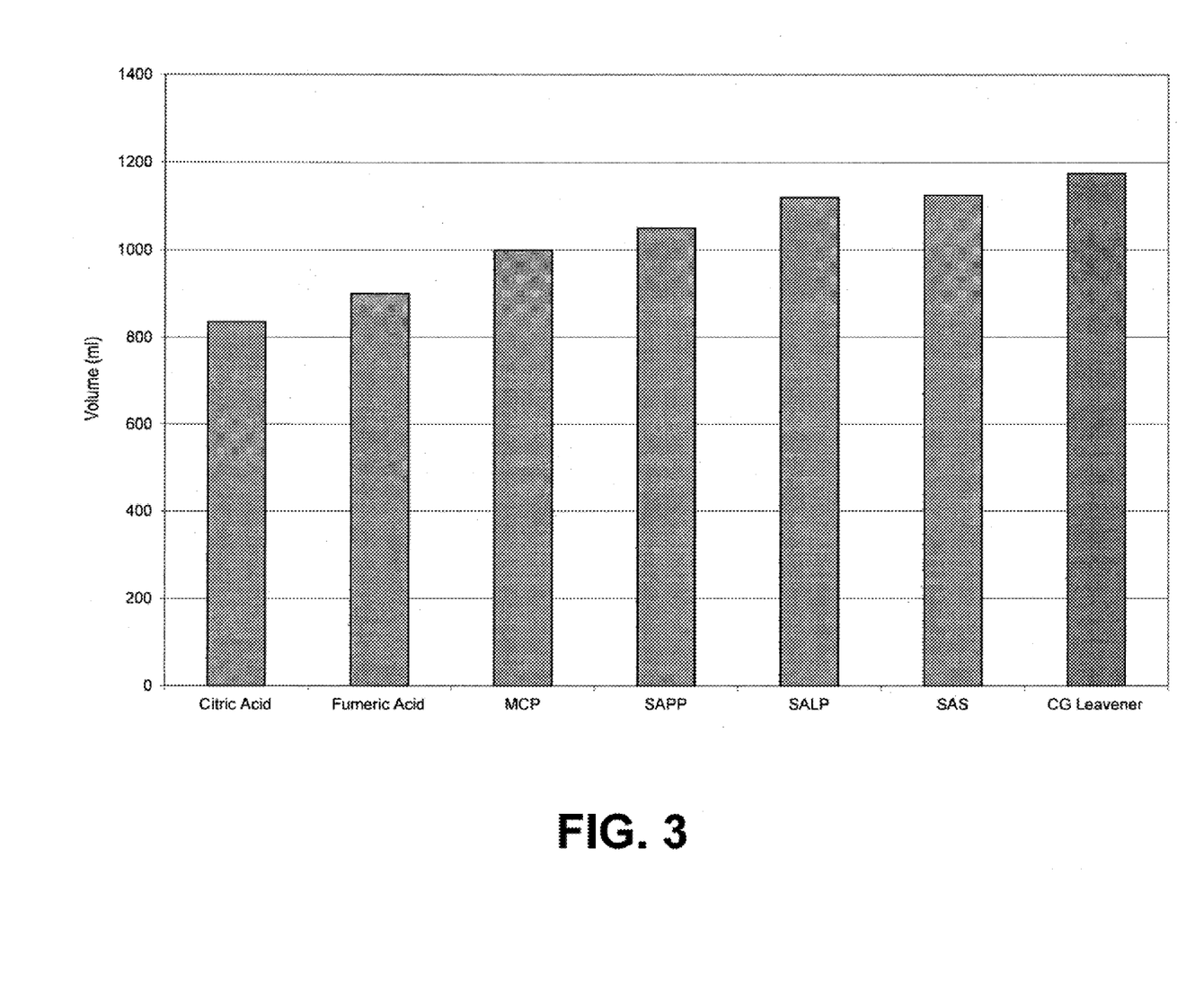
FIG. 3 shows a bar graph illustrating the difference between the volume of the end-product baked good resulting from the tortilla dough of Series 2 of FIG. 3 and data regarding other tortilla doughs comprising different leaveners and raw acidulates published in *Chemical Leavening Agents* by Ernst Brose et al. (Budenheim/H. Schmidt Mainz, 1996).

FIG. 3 illustrates the difference in volume developed from the tortilla doughs comprising a 1:1 ratio of encapsulated fumaric acid to raw fumaric acid of Series 2 as compared to tortilla doughs comprising other leaveners and acidulates known in the art. As is illustrated in FIG. 3, the tortilla dough of Series 2 comprising the fumaric acid blend composition results in an end-product that exhibits an increased volume over tortilla doughs containing raw acidulates.

While various embodiments of baking additive compositions, and methods for producing and using such compositions have been described in considerable detail herein, the embodiments are merely offered by way of non-limiting examples of the disclosure described herein. Many variations and modifications of the embodiments described herein will be apparent to one of ordinary skill in the art in light of this disclosure. It will therefore be understood by those skilled in the art that various changes and modifications may be made, and equivalents may be substituted for elements thereof, without departing from the scope of the disclosure. For example, it will be understood that any type of acidulate may be employed in the acidulate composition disclosed herein. Indeed, this disclosure is not intended to be exhaustive or to limit the scope of the disclosure. The scope of the disclosure is to be defined by the appended claims, and by their equivalents.

Further, in describing representative embodiments, the disclosure may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps disclosed herein should not be construed as limitations on the claims. In addition, the claims directed to a method and/or process should not be limited to the performance of their steps in the order written, and one skilled in the art can readily appreciate that the sequences may be varied and still remain within the spirit and scope of the present disclosure.

It is therefore intended that the disclosure will include, and this description and the appended claims will encompass, all modifications and changes apparent to those of ordinary skill in the art based on this disclosure.

What is claimed is:

1. A baking additive comprising:
 a first quantity of acidulate comprising acidulate particles;
 a second quantity of acidulate wherein the second quantity of acidulate is not encapsulated within a coating;
 an edible, heat degradable, encapsulating coating surrounding each of the particles of the first quantity of acidulate, the encapsulating coating being at least partially degradable by heating the coating to a predetermined temperature; and
 wherein the first quantity of acidulate and the second quantity of acidulate are blended together at a ratio of about 1:1 by weight to form a composition, the composition capable of decreasing the pH of a dough-based product.

2. The baking additive of claim 1, wherein the first quantity of acidulate is selected from a group consisting of citric acid, malic acid, fumaric acid, potassium citrate, sodium citrate, lactic acid, and ascorbic acid.

3. The baking additive of claim 1, wherein the second quantity of acidulate is selected from a group consisting of citric acid, malic acid, fumaric acid, potassium citrate, sodium citrate, lactic acid, and ascorbic acid.

4. The baking additive of claim 1, wherein the first quantity of acidulate and the second quantity of acidulate comprise fumaric acid.

5. The baking additive of claim 1, wherein the encapsulating coating of each of the particles of the first quantity of acidulate comprises between about 0.1% to about 70.0% of the total coated particle weight.

6. The baking additive of claim 1, wherein the encapsulating coating comprises a fat-based coating.

7. The baking additive of claim 6, wherein the fat-based coating comprises at least two fats.

8. The baking additive of claim 7, wherein the fat-based coating comprises a first solidified oil and a second solidified oil.

9. The baking additive of claim 8, wherein the first solidified oil and the second solidified oil are combined at a ratio of about 1:1 by weight.

10. The baking additive of claim 6, wherein the melting point of the fat-based coating is between about 138 degrees Fahrenheit and about 150 degrees Fahrenheit.

11. The baking additive of claim 6, wherein the melting point of the fat-based coating is between about 105 degrees Fahrenheit and about 122 degrees Fahrenheit.

12. The baking additive of claim 7, wherein the melting point of the fat-based coating is between about 105 degrees Fahrenheit and about 122 degrees Fahrenheit.

13. A method of producing a preservative enhancing baking additive comprising the steps of:
 providing a first quantity of acidulate comprising acidulate particles;
 providing a second quantity of acidulate comprising acidulate particles;
 encapsulating the particles of the first quantity of acidulate with an edible, heat degradable coating; and
 blending the first quantity of acidulate with the second quantity of acidulate at a ratio of about 1:1 by weight to form a composition;
 wherein the acidulate particles of the second quantity of acidulate are not encapsulated within a coating.

14. The method of claim 13, wherein the first quantity of acidulate and the second quantity of acidulate comprise fumaric acid.

15. The method of claim 13, wherein the coating comprises a fat-based coating.

16. The method of claim 15, wherein the fat-based coating comprises at least two fats.

17. The method of claim 16, wherein the step of encapsulating the particles of the first quantity of acidulate with an edible, heat degradable coating further comprises the steps of:
 mixing a first fat with a second fat;
 melting the first fat and the second fat such that the first fat and the second fat combine into a fluid state; and
 coating the first quantity of acidulate with the fluid state.

18. The method of claim 13, wherein the step of encapsulating each of the particles of the first quantity of acidulate with an edible, heat degradable coating further comprises the step of using an encapsulation technique selected from the group consisting of hot-melt encapsulation, spray drying, extrusion, coacervation, fluid bed coating, and liposome entrapment.

19. A method of producing a baked product containing a preservative, the method comprising the steps of:
 providing a preservative enhancing baking additive comprising:
  a first quantity of acidulate comprising acidulate particles;
  an edible, heat degradable, encapsulating coating surrounding each of the particles of the first quantity of acidulate, the encapsulating coating being at least partially degradable by heating the coating to a predetermined temperature;

a second quantity of acidulate comprising acidulate particles, each acidulate particle of the second quantity of acidulate not comprising a coating thereon; and wherein the first quantity of acidulate and the second quantity of acidulate are blended together in a 1:1 ratio by weight;

adding the baking additive to a dough mix for a baked product, wherein the second quantity of acidulate not comprising a coating reduces the pH of the dough mix to increase the antimicrobial effect of the preservative contained therein;

processing the dough mix to obtain a dough; and heating the dough above the predetermined temperature, thereby gradually releasing the first quantity of acidulate by degrading the encapsulating coating to reduce the pH of the baked product.

20. The method of claim 19, wherein the dough mix further comprises a leavening system comprising a yeast, and the method further comprises the step of proofing the dough such that the leavening system leavens the dough.

21. The method of claim 19, wherein the dough mix further comprises a leavening system comprising a leavening acid and a leavening base and wherein the step of processing the dough mix to obtain a dough, the coating on each of the particles of the first quantity of acidulate prevents the first quantity of acidulate from reacting with the leavening base.

22. The method of claim 19, wherein the baked product comprises a tortilla.

23. The method of claim 19, wherein the predetermined temperature comprises a temperature between about 105 degrees Fahrenheit and about 150 degrees Fahrenheit.

* * * * *